(12) United States Patent
Schneider

(10) Patent No.: US 7,118,064 B2
(45) Date of Patent: Oct. 10, 2006

(54) FRICTIONAL CLUTCH FOR TORQUE-RESTRICTED TORSIONAL POWER TRANSMISSION BETWEEN TWO REELS OF A HAND-HELD DEVICE

(75) Inventor: Roland Schneider, Kelkheim (DE)

(73) Assignee: Societe BIC, Clichy Cedex (FR)

( * ) Notice: Subject to any disclaimer, the term of this patent is extended or adjusted under 35 U.S.C. 154(b) by 0 days.

(21) Appl. No.: 11/136,656

(22) Filed: May 23, 2005

(65) Prior Publication Data

US 2006/0163413 A1 Jul. 27, 2006

Related U.S. Application Data

(63) Continuation of application No. PCT/EP03/11350, filed on Oct. 14, 2003.

(30) Foreign Application Priority Data

Nov. 22, 2002 (EP) ................................ 02026099

(51) Int. Cl.
*B65H 18/08* (2006.01)
(52) U.S. Cl. ............................ 242/538.1; 242/396.6; 242/412.1
(58) Field of Classification Search .. 242/538.1–538.3, 242/396.6, 394, 412.1; 156/577
See application file for complete search history.

(56) References Cited

U.S. PATENT DOCUMENTS 2,637,987 A * 5/1953 Hill et al. ..................... 464/37
3,740,299 A 6/1973 Mulfinger et al.
3,802,222 A 4/1974 Weber
4,438,891 A * 3/1984 Wiig ........................ 242/334.6
4,522,351 A * 6/1985 Yessian et al. ........... 242/412.1
4,533,090 A * 8/1985 Blaschek .................. 242/412.1
4,718,971 A 1/1988 Summers
4,851,074 A 7/1989 Hiromichi
6,079,660 A * 6/2000 Manusch et al. ......... 242/538.1
6,145,770 A * 11/2000 Manusch et al. ......... 242/422.4
6,796,355 B1 * 9/2004 Huthmacher et al. ....... 156/577
6,945,492 B1 * 9/2005 Koreska ................... 242/538.1

FOREIGN PATENT DOCUMENTS

DE 42 17 295 A 12/1993

OTHER PUBLICATIONS

International Search Report for International Application PCT/EP02/07965.

* cited by examiner

*Primary Examiner*—William A. Rivera
*Assistant Examiner*—Sang Kim
(74) *Attorney, Agent, or Firm*—Jones Day

(57) ABSTRACT

An embodiment of the invention relates to a frictional clutch for a hand-held device for transferring a film from a backing tape onto a substrate. The frictional clutch in this embodiment includes a supply reel and a take-up reel rotatably mounted coaxially to each other, one of the reels including a free space bordered by a circular ring surface of the other reel, a spring element being disposed in the free space, with the spring element pressing elastically against the circular ring surface. In one embodiment of the frictional clutch, the free space is located radially outside the convex circular ring surface and the spring element is biased radially towards inside against the circular ring surface.

10 Claims, 2 Drawing Sheets

US 7,118,064 B2

FRICTIONAL CLUTCH FOR TORQUE-RESTRICTED TORSIONAL POWER TRANSMISSION BETWEEN TWO REELS OF A HAND-HELD DEVICE

CROSS-REFERENCE TO RELATED APPLICATION

This application is a continuation of PCT Application No. PCT/EP03/11350, filed on Oct. 14, 2003, which claims priority to European Patent Application 02 026 099.8, filed on Nov. 22, 2002. The entire contents of these two applications is expressly incorporated herein.

FIELD OF THE INVENTION

The invention relates to a frictional clutch for a hand-held device for transferring a film from a backing tape onto a substrate.

BACKGROUND OF THE INVENTION

Such a frictional clutch serves for creating drive adjustment for a take-up reel of a hand-held device for transferring a film from a backing tape onto a substrate, said take-up reel being driven so forcedly that the backing tape portion being supplied to the take-up reel is always slightly tensioned. In doing so, the frictional clutch ensures that the predetermined tension is not exceeded and the backing tape does not rupture.

A frictional clutch as indicated in the foregoing is described in document DE 4217295A1. In said previously-known embodiment, the frictional clutch is disposed between a supply reel and a rotating member, which is connected with the supply reel of an appertaining device by rotational drive connection. The frictional clutch comprises a sleeve-like spring element in the form of an open spring ring, which is disposed in a ring slot between two coaxially disposed sleeve-like bearing members and thereby constitutes a bearing member whose inner generated surface is on the outer generated surface of the inner bearing member, while the outer bearing member is on the outer generated surface of the sleeve-like spring. By radial bending, the spring ring presses elastically against the cylindrical inner generated surface of the outer bearing member, as a result of which the frictional clutch is formed due to cumbersome running.

In said previously known frictional clutch, it is difficult to manufacture the spring ring in a form and size so as to form a circular ring-shaped bearing surface on which the reel can slide over a large surface. There is a danger of the spring ring to relieve primarily into two opposite directions, so that it cannot offer a bearing surface in circular form to the reel located thereon. As a result thereof, support of the reel can be impaired, for instance, by excessive movement clearance due to wear of the relatively small bearing surface portions. As a result thereof, chattering can occur upon rotation of the reel, which is undesirable.

SUMMARY OF THE INVENTION

An object of one embodiment of the invention is to simplify the manufacture of a frictional clutch.

In one embodiment of the frictional clutch of the invention, the spring element is freed from the bearing function. The spring element of the embodiment of the invention has merely a frictional function and not a bearing function. It presses radially elastically against a preferably cylindrical circular ring surface of the other reel, whereby, for one, pivoting guidance at a certain torque is ensured and, for the other, slippage is ensured when torque is exceeded. Since the spring element does not perform any bearing function, it need not be adapted to the shape of any bearing surface, so that it can be of simple design, which is conducive to the aim of creating simple and inexpensive design.

In order to design the spring element with favorable elasticity which remains the same over a long period of operation, longish or bar-like shape of the spring element is preferable, in particular in the form of a leaf spring which is supported in its end portions and presses elastically against the circular ring surface with its central portion. It is preferable to use a bar-like spring or a leaf spring, which extends in a straight fashion when in a stress-relieved condition and thus can be produced or prefabricated in a simple and inexpensive fashion. By radial bending out of the central portion of the bar-like or leaf spring, said portion can enter into frictional contact with the opposing circular ring surface, while the free end portions of the leaf spring are supported in the free space receiving them.

Another embodiment of the invention includes providing two support positions for ends of the bar-like spring element on a line secantially with respect to the cylindrical circular ring surface. During assembly, the bar or leaf-shaped spring element is bent out into the free space available far enough to abut on the cylindrical outer generated surface of the other reel in the event of an elastic restoring tension. In this embodiment, not only simple construction is ensured but also simple assembly and disassembly.

Within the framework of the embodiments of the invention, the spring element is preferably made of steel, in particular spring steel, or plastics. In case of a longish construction in the form of a bar-like or leaf spring, it abuts on the preferably cylindrical outer generated surface of the other reel either punctually or linearly depending on its cross-sectional form.

Moreover, in an embodiment of the invention, it is preferable to design two plug-in sockets for the free ends of the bar or leaf-like spring element in the free space receiving the spring element. In the embodiment, the spring element is held at the appertaining reel in a form-fit fashion.

The invention is described in more detail by means of a preferred embodiment. However, the scope of the claims is not limited to the preferred embodiment.

BRIEF DESCRIPTION OF THE DRAWINGS

FIG. 3 is a perspective top view of a take-up reel of the hand-held device.

DETAILED DESCRIPTION OF THE INVENTION

Figure 1:
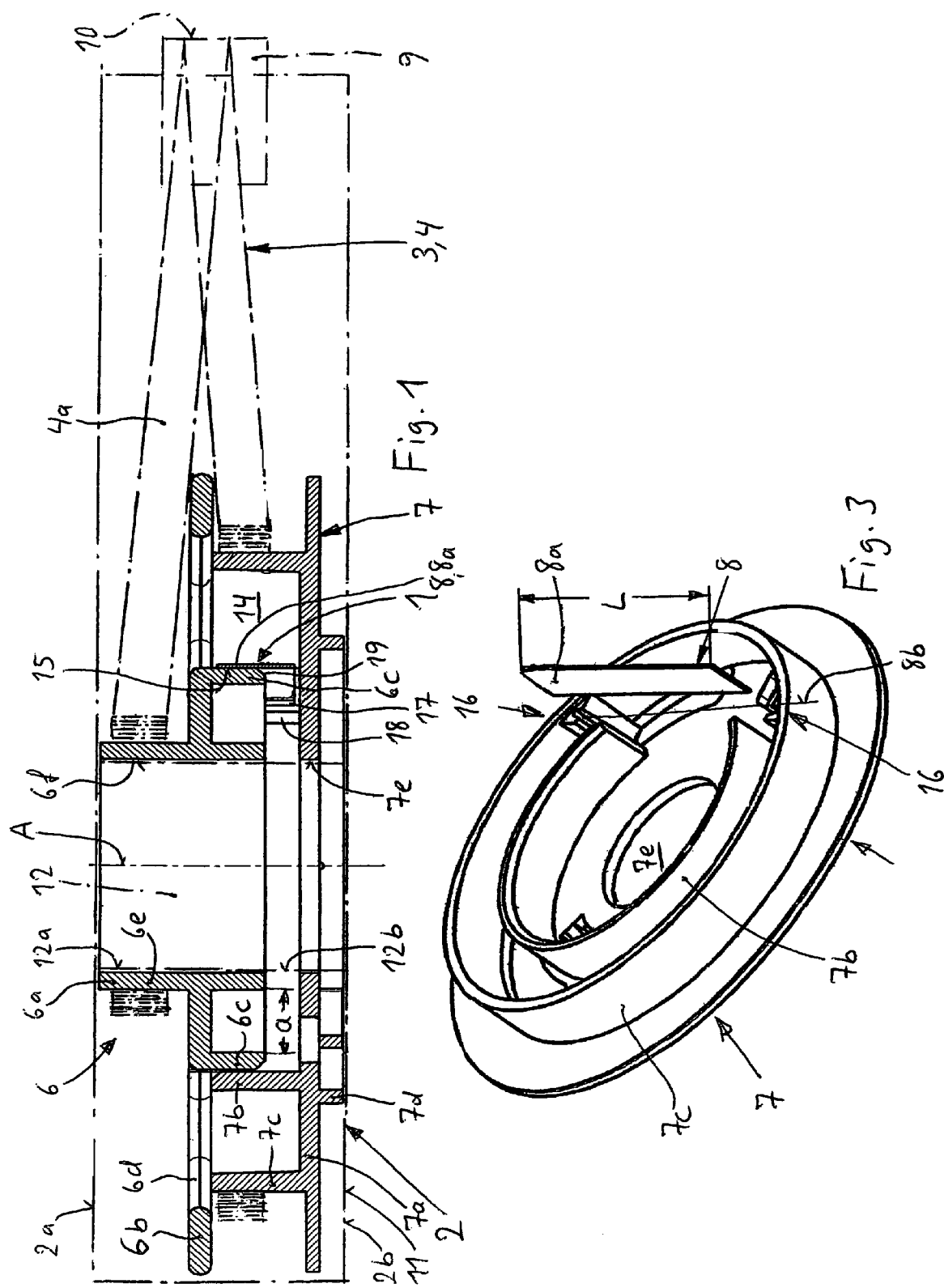
FIG. 1 shows a frictional clutch according to an embodiment of the invention, the clutch being integrated between two reels of a hand-held device for transferring a film from a backing tape onto a substrate, when viewed in an axial direction.
Figure 2:
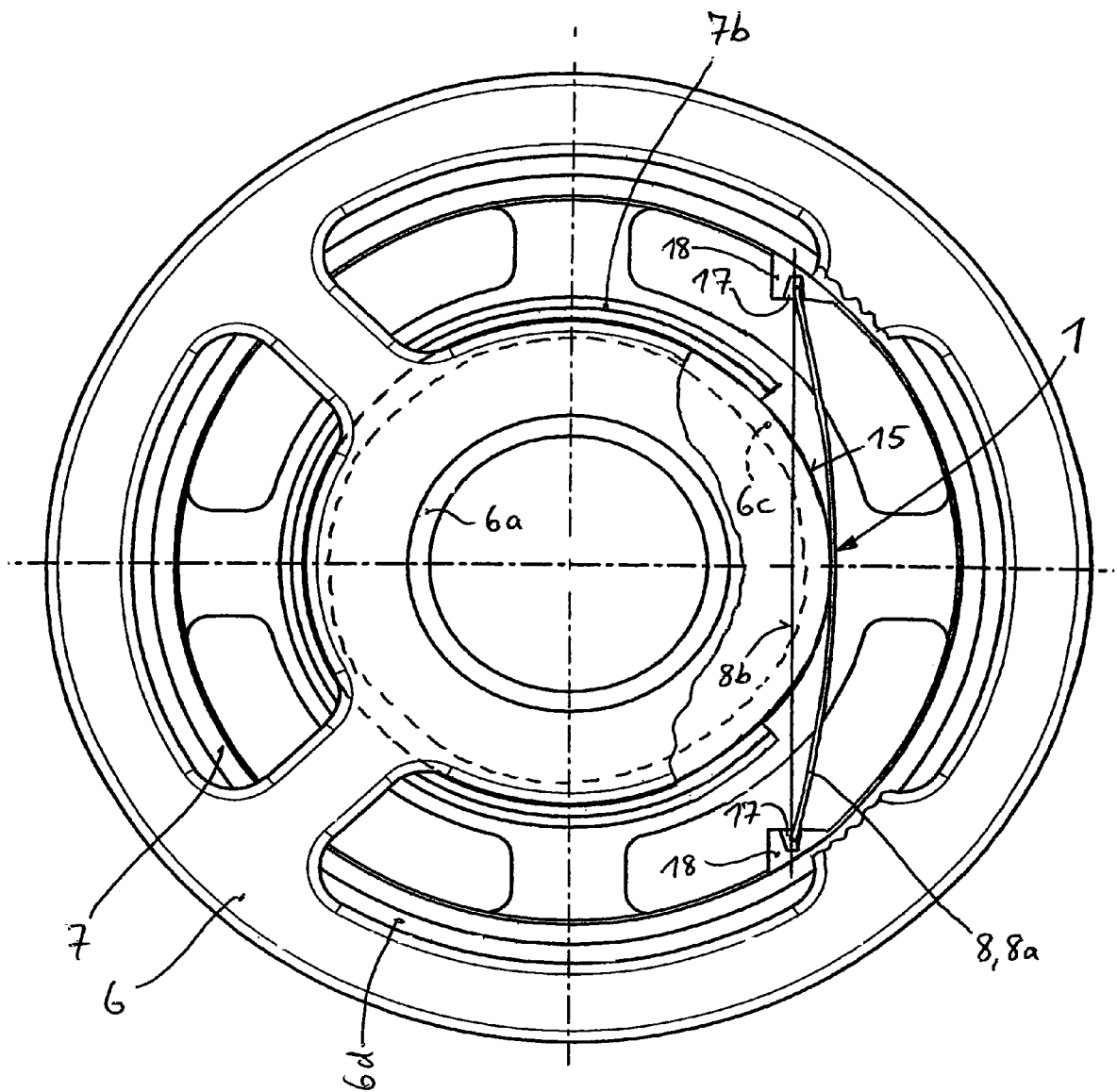
FIG. 2 shows the frictional clutch in an axial sectional view of the reels.

The frictional clutch referred to by 1 in its entirety is designed by incorporating three components of a hand-held device 2 for transferring a film 3 from a backing tape 4 onto a substrate, namely by incorporating a supply reel 6, a take-up reel 7 and a spring element 8. The backing tape 4 is wound up on the supply reel 6 so as to form a supply and extends to a wedge-shaped application member 9 having a wedge-shaped or slightly rounded application edge 10, around which the backing tape 4 is wound and extends to the take-up reel 7, onto which it is wound automatically when the hand-held device 2 is being used. The film 3 adheres to the outer side of the backing tape 4, and thus also to the outer side of the backing tape portion 4a extending from the supply reel 6 to the application edge 10. The application member 9 projects with its application edge 10 from the housing 11, which is represented in outlines and which comprises an outlet opening and an inlet opening for the backing tape 4 above and below the application member 9 and can consist of two, particularly shell-like housing parts 2a, 2b, whose joint can extend in an axis extending perpendicularly to the common central axis of the reels 6 and 7.

It is from one or from both housing walls on both sides that at least one hollow-cylindrical bearing axle 12a, 12b protrudes into the interior of the housing, on which at least one of the reels 6 and 7 is rotatably mounted, in this case both reels 6 and 7.

The supply reel 6 consists of a hollow-cylindrical bushing 6a, from whose central portion a flange 6b extends to the outside, from which a hollow-cylindrical bearing ring 6c projects axially at a radial distance "a" from the bushing 6a. What can be found radially outside the bearing ring 6c in the flange 6b are several holes or longitudinal holes 6d which are distributed along the periphery and which primarily serve for saving material and weight.

The take-up reel 7 has a disc body 7a, from whose one side an inner bearing ring 7b and an outer reel ring 7c project concentrically and can, but do not have to, have the same axial length. On the opposite side, a small distance ring 7d also projects from the disc body 7a. The diameters of the first and second bearing rings 6c, 7b can be harmonized in consideration of bearing clearance; in a preferred embodiment, the second bearing ring 7b overlaps the first bearing ring 6c, with the supply reel 6 and the take-up reel 7 being axially put together in a position in which the bearing rings 6c and 7b are directed towards each other. When the reels are put together, the flange 6b is axially supported at the take-up reel 7 at the free face side of the inner bearing ring 7b and/or the reel ring 7c. The bushing portion 6e projecting from the flange 6b towards the side facing away from the take-up reel 7 forms the actual reel body of the supply reel 6. The reel body of the take-up reel 7 is constituted by the reel ring 7c. The supply reel 6 thus is freely rotatably supported with its hollow-cylindrical bushing 6a or its cylindrical bearing hole 6f on the preferably hollow-cylindrical bearing axle 12a. For support on the bearing axle 12b, the take-up reel 7 has a concentric bearing hole 7e, which is preferably identical in size, in its disc body 7a, so that the disc body 7a is also freely rotatably supported on the bearing axle 12 with its hole edge. In the area of mutual overlapping of the bearing rings 6c and 7b, the supply reel 6 and the take-up reel 7 can, but do not have to, be supported at each other in addition. As an alternative, it is also possible to support the take-up reel 7 at the supply reel 6 or the supply reel 6 at the take-up reel 7 only in the area of the overlapping bearing rings 6c and 7b in a freely rotatable fashion.

The frictional clutch 1 is disposed to be active between the supply reel 6 and the take-up reel 7 and has the elastically deformable spring element 8 which elastically spreads apart parts of the two reels 6 and 7 and thus causes pivoting guidance at a certain torque due to friction if one of the two reels 6 and 7 is rotated and which slips through if torque exceeds a certain value. This is true in cases in which the reel to be driven, here the take-up reel 7, is prevented from rotation or is decelerated. The spring element 8 is positioned in a free space 14 of the one reel, which borders a circular ring surface 15 concentric with respect to the common axis of rotation A of the other reel, with the spring element 8 being radially biased against the circular ring surface 15 and thus generating the desired torque in the event of a relative rotational movement between the reels.

The spring element 8 is preferably constituted by a leaf spring 8a, which can be made of metal, e.g. spring steel, or a hard plastic material. The leaf spring 8a can be fixed by providing plug-in sockets 16 for the ends of the leaf spring 8a, in which the leaf spring 8a is held in a form-fit manner. The plug-in sockets 16 can be formed e.g. by axially extending slots 17 which are open at their sides facing each other, in which the leaf spring 8a can be axially inserted with its ends. The elastic tension is generated by the fact that the leaf spring 8a is bent out in its operating position and thus presses against the circular ring surface 15 by the tension produced as a result thereof. This can be achieved in a simple and advantageous fashion by using a leaf spring 8a which extends in a straight manner when in a stress-released condition, and it is positioned at the one reel such that it extends secantially with respect to the circular ring surface 15 when it is in a stress-relieved straight condition. When assembling the reels, the leaf spring 8a is bent out by the circular ring surface 15, as a result of which the elastic tension is generated. The ends of the leaf spring 8a remain positioned in such bending out, e.g. in the plug-in sockets 16 previously described.

In the present exemplified embodiment, the free space 14 directly borders the circular ring surface 15, which is formed by the outer generated surface of the bearing ring 6c of the supply reel 6. Since the bearing ring 7b surrounds the bearing ring 6c in the present embodiment, the bearing ring 7b is recessed over a peripheral portion of e.g. approximately 90°, so that the circular ring surface 15 of the bearing ring 7b directly limits the free space 14 from inside.

For form-fit support of the ends of the leaf spring 8a, the plug-in sockets 16 are arranged with their slots 17 facing each other such that an imagined line 18 or axis-parallel plane crossing the slots 17 extends secantially with respect to the circular ring surface 15 or the bearing ring 6c. When axially putting together the reels 6 and 7, the leaf spring 8a is radially bent out, as illustrated in FIG. 1, with the radial elastic tension being generated. In the event of such bending out, the leaf spring 8a is slightly shortened. Therefore, its length L is to be dimensioned long enough for it to remain in its holders. On principle, it is sufficient for only one end of the leaf spring 8a to be held like a movable bearing, and the other end can be fixed rigidly. In the embodiment having the plug-in sockets 16, both ends are held in a form-fit fashion like a movable bearing.

The plug-in sockets 16 can be formed by material lugs 18, which are formed in a one-part form at the reel supporting them, here the take-up reel 7, for instance inside at the reel ring 7c.

In order to enhance bending out of the leaf spring 8a when axially putting together the reels 6 and 7, what is provided at the free outer periphery of the circular ring surface 15 or here the bearing ring 6c is a convergent introduction surface 19, e.g. in the form of a rounded or oblique surface, which urges the leaf spring 8a outwards when the reels are put together.

The reels 6 and 7 are preferably made of plastics and can be injection-molded parts which can be produced by injection molding in a simple, speedy and inexpensive manner also if difficult shapes are required. The leaf spring 8*a* is preferably a pre-fabricated component which is punched out or cut off longitudinally from a strip.

The invention claimed is:

1. A hand-held device having a frictional clutch for transferring a film from a backing tape onto a substrate, comprising:

a supply reel and a take-up reel rotatably mounted coaxially to each other, one of said reels including a free space bordered by a circular ring surface of said other reel, a spring element being disposed in said free space, said spring element pressing elastically against said circular ring surface, wherein said free space is located radially outside a convex circular ring surface and the spring element is biased radially against the circular ring surface.

2. A hand-held device having a frictional clutch as claimed in claim 1, wherein said spring element is a rectangularly-shaped spring element extending approximately tangentially to said circular ring surface and is fixed at one or at both ends.

3. A hand-held device having a frictional clutch as claimed in claim 2, wherein said spring element extends secantially with respect to said circular ring surface when it is in a stress-relieved condition.

4. A frictional clutch as claimed in claim 2, wherein said spring element is fixed at one or at both ends in plug-in sockets.

5. A hand-held device having a frictional clutch as claimed in claim 4, wherein said plug-in socket or said plug-in sockets are formed by a slot extending in parallel to the axis of rotation of said take-up reel.

6. A hand-held device having a frictional clutch as claimed in claim 5, wherein said plug-in sockets further comprise axially extending slots.

7. A hand-held device having a frictional clutch as claimed in claim 2, wherein said spring element is formed by a leaf spring extending in a straight fashion in its stress-relieved condition.

8. A hand-held device having a frictional clutch as claimed in claim 7, wherein said free space directly borders said circular ring surface.

9. A hand-held device having a frictional clutch as claimed in claim 8, wherein said spring element is made of plastics or metal.

10. A hand-held device having a frictional clutch as claimed in claim 9, wherein said circular ring surface has a rounded or oblique surface.

* * * * *